United States Patent [19]

Nalewajek

[11] Patent Number: 4,886,921
[45] Date of Patent: Dec. 12, 1989

[54] SYNTHESIS OF CARBON FLUORIDE AND CARBON FLUORIDE CHLORIDE

[75] Inventor: David Nalewajek, West Seneca, N.Y.

[73] Assignee: Allied-Signal Inc., Morris Township, Morris County, N.J.

[21] Appl. No.: 182,637

[22] Filed: Apr. 18, 1988

[51] Int. Cl.$^4$ ............... C07C 17/20; C07C 19/08
[52] U.S. Cl. ................... 570/170; 570/171
[58] Field of Search .................... 570/170, 171

[56] References Cited

U.S. PATENT DOCUMENTS

| | | | |
|---|---|---|---|
| 2,786,874 | 3/1957 | Teeters et al. | 260/653 |
| 3,872,032 | 3/1975 | Kamemaru et al. | 260/2 H |
| 3,925,263 | 12/1975 | Ukaji et al. | 260/2 H |
| 3,925,492 | 12/1975 | Ukaji et al. | 260/653.9 |
| 3,929,918 | 12/1975 | Meshri et al. | 260/653.9 |
| 4,139,474 | 2/1979 | Watanabe et al. | 252/1 |
| 4,243,615 | 6/1981 | Watanabe et al. | 570/150 |
| 4,423,261 | 12/1983 | Watanabe et al. | 570/150 |
| 4,438,086 | 3/1984 | Aramaki et al. | 423/448 |
| 4,447,663 | 5/1984 | Akiyami et al. | 570/150 |
| 4,548,881 | 10/1985 | Nalewajek et al. | 429/194 |

FOREIGN PATENT DOCUMENTS 759173 8/1949 United Kingdom.

OTHER PUBLICATIONS

Richard J. Lagow, et al.; Some New Synthetic Approaches to Graphite–Fluorine Chemistry; 9/3/73.

Primary Examiner—J. E. Evans
Attorney, Agent, or Firm—Melanie L. Brown; Jay P. Friedenson

[57] ABSTRACT

An improved synthesis of carbon fluoride $CF_x$, and carbon fluoride chloride, $(C_yF_xCl_z)_n$, is described. Direct fluorination of the intermediate $(C_yF_xCl_z)_n$ ($x \leq 0.7$, $y \leq 1$ and $z \leq 0.1$) in the absence of chlorine produces, either $CF_x$ ($x \geq 1$) or $(C_yF_xCl_z)_n$ ($x \geq 0.9$, $y = 1$, $z \leq 0.01$) in as brief a period as 1 hour. The final $CF_x$ product is novel and exhibits improved properties compared to $CF_x$ made via conventional methods. The novel process for producing carbon fluoride chloride is more economical than prior art methods.

10 Claims, 1 Drawing Sheet

SYNTHESIS OF CARBON FLUORIDE AND CARBON FLUORIDE CHLORIDE

This invention relates to an improved method of preparing carbon fluoride ($CF_x$) and carbon fluoride chloride $(C_yF_xCl_z)_n$ involving the direct fluorination of an intermediate carbon fluoride chloride. Depending upon reaction conditions, either $CF_x (x \geq 1)$ or $(C_yF_xCl_z)_n (x \geq 0.9, y=1, z \leq 0.01)$ is produced in as little as 1 hour. The final $CF_x$ product is novel and exhibits improved properties compared to $CF_x$ made via conventional methods. The novel process for producing carbon fluoride chloride is more economical than prior art methods.

BACKGROUND OF THE INVENTION

Carbon monofluoride $CF_x$, exists as a series of compositions wherein the x value can range from 0.1 to 1.26. Current interest in these compositions stems from the potential industrial applications in such diverse areas as lubrication, stain repellent materials, battery materials, anti-wetting agents, etc.

In the prior art, compositions of this kind are conventionally prepared by contacting various forms of carbon with fluorine gas and an inert diluent. In this respect, the following prior art generally typifies known methods for making compositions of this kind:

(1) The preparation of poly-dicarbon monofluoride as disclosed in U.S. Pat. No. 4,139,474.

(2) A process for the continuous fluorination of carbon as disclosed in U.S. Pat. No. 4,447,663.

(3) A process for producing a graphite fluoride comprising mainly polydicarbon monofluoride represented by the formula $(C_2F)_n$ as disclosed in U.S. Pat. No. 4,423,261.

(4) A process for preparing polycarbonmonofluoride as disclosed in U.S. Pat. No. 3,925,263.

(5) A process for the preparation of graphite fluoride as disclosed in U.S. Pat. No. 3,872,032.

(6) A process for preparing poly-dicarbon monofluoride as disclosed in U.S. Pat. No. 4,243,615.

(7) A method for the preparation of graphite fluoride by contact reaction between carbon and fluorine gas as disclosed in U.S. Pat. No. 4,438,086.

(8) The synthesis of fluorographite as disclosed in U.S. Pat. No. 3,929,918.

(9) The process for preparing polycarbonmonofluoride as disclosed in U.S. Pat. No. 3,925,492.

(10) A mechanism described as providing new synthetic approaches to graphite-fluorine chemistry as disclosed by Lagow et al., J. C. S. Dalton, 1268 (1974).

However, most of the known prior art methods suffer from one or more disadvantages. A particular disadvantage among the drawbacks of the prior art is the long reaction time required to completely fluorinate a carbon material to ensure complete formation to $CF_1$. Required reaction periods of from 120 hours to as long as several hundred hours have been noted. This long reaction period requires the use of large quantities of fluorine gas, thus rendering the production of $CF_x$ as excessively costly. Also during this long reaction period, there is a tendency for side reactions to occur. Some typical by-product formation reactions are illustrated by the following reactions.

(1) $4CF_x \longrightarrow 3xC + xCF_4$ eq.

(2) $C + 2F_2 \longrightarrow CF_4$ eq.

Thus, the overall process results in a low yield of $CF_x$ and the formation of large quantities of gaseous byproduct. Again, the relatively expensive reagent, fluorine, is wasted.

During the formation of these by-products substantial quantities of heat can also be liberated. With the increase in heat in the reactor, the probability arises for the propagation or formation of by-products. Also, the result of this aforementioned heat buildup could be a violent uncontrolled decomposition leading to an explosion. Thus, there still exists the need to provide a means of preparing $CF_x$ in as short of a time span as possible to alleviate the problems mentioned above.

In an analogous manner to $CF_x$, the need is present for a suitable means for preparing $(C_yF_xCl_z)_n$ which is also growing in importance in industrial applications. This has arisen because of the superior properties of $(C_yF_xCl_z)_n$ as compared to $CF_x$ as indicated for example in U.S. Pat. No. 4,548,881. Carbon chloride fluoride is prepared by a similar heterogeneous reaction of carbon with mixtures of chlorine and fluorine in an inert diluent. (Both the chlorine and fluorine atoms in such molecules are covalently bonded to carbon.) These procedures as disclosed in U.S. Pat. No. 4,548,881 are detailed in British Patent 759,173 and U.S. Pat. No. 2,787,874 and are hereby incorporated herein by reference. However, the procedures as disclosed in this prior art suffer from either requiring long reaction times or high reaction temperatures, leading to by-product formation as described above. Clearly, the need for an improved procedure for the preparation of $CF_x$ and $(C_yF_xCl_z)_n$ exists.

SUMMARY OF THE INVENTION

It is an object of this invention to provide a process which avoids the disadvantages of prior art methods as alluded to above. It has been found that such object is accomplished by fluorinating an intermediate or precursor $(C_yF_xCl_z)_n$ compound in the absence of chlorine gas at elevated temperatures up to about 450° C. (depending on the product desired).

It is another object of the invention to provide a means for deriving $CF_x$ products with improved properties over prior art $CF_x$.

In accordance with the method of the invention carbon fluoride ($CF_x$), and carbon fluoride chloride $(C_yF_xCl_z)$, are prepared wherein for $CF_x$ the x value may range from 0.7–1.2 and wherein for carbon fluoride chloride $(C_yF_xCl_z)_n$ the x value may range from 0.7–1.2, the y value is 1 and the z value is $\leq 0.1$, by contacting a starting material comprising a precursor carbon fluoride chloride $(C_yF_xCl_z)_n$ where $x \leq 0.7$, $y \leq 1$ and $z \leq 0.1$ with fluorine gas in an inert diluent such as nitrogen ($N_2$) in the absence of chlorine gas. These products can be produced in relatively brief times such as in as little as 0.75 hours at elevated temperatures up to about 450° C. depending upon the product desired. Yields in excess of 90% are routinely achieved. The starting carbon fluoride chloride $(C_yF_xCl_z)_n$, where $x \leq 0.7$, $y \leq$ and $z \leq 0.1$ is prepared by reacting carbon with a mixture of fluorine and chlorine gas in an inert diluent such as nitrogen at about 400° C. for 3 hours as described in U.S. Pat. No. 4,548,881.

The process of the invention represents an economical means of production of $CF_x$ or $(C_yF_xCl_z)_n$. It has been found that the $CF_x$ prepared by this process is superior to prior art $CF_x$ compounds when used as the cathode material in $Li/CF_x$ batteries. It is not understood what structural features of the $CF_x$ thus produced are responsible for such difference in properties.

DETAILED DESCRIPTION OF THE INVENTION

Figure 1:
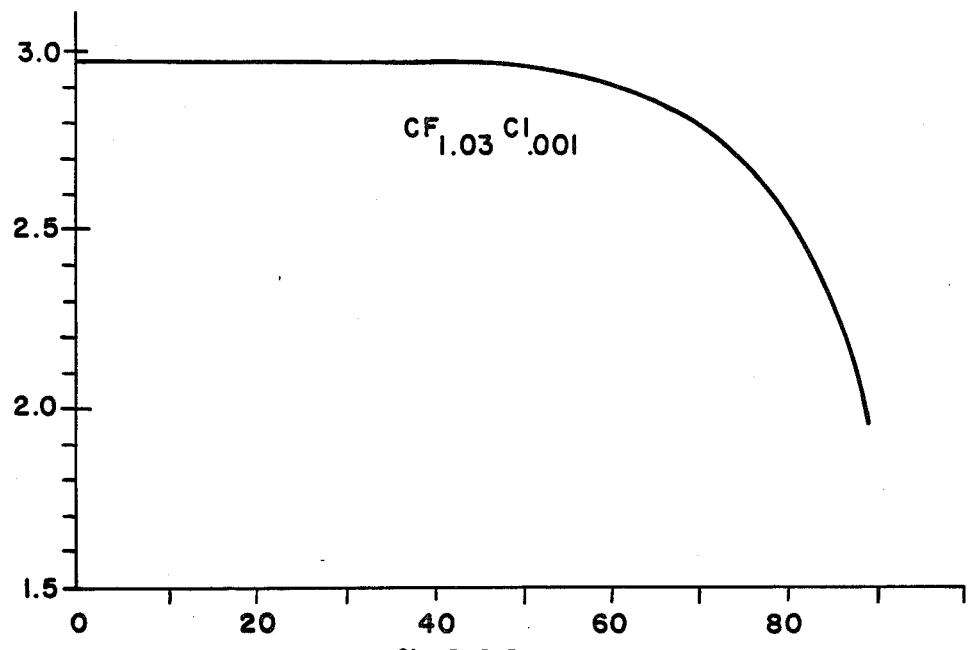
FIG. 1 shows the discharge curve for a battery incorporating $C_yF_xCl_z$ prepared according to this invention.

As described in U.S. Pat. No. 2,786,874 the synthesis of carbon fluoride, $CF_x$, is effected by reacting Norit (an activated carbon black) with chlorine and fluorine at elevated temperatures. The small concentration of halogen other than fluorine was indicative of adsorbed material, a common property of activated carbon blacks. This was substantiated by treating graphite under similar conditions, which clearly indicated the absence of chlorine in the product. The other halogen only appeared present when using highly adsorptive carbon as indicated in Table III of that patent.

In contrast to the work disclosed in that patent, U.S. Pat. No. 4,548,881 discloses the production of chlorofluorinated material from a more ordered form of carbon, i.e., needle coke. With this form of carbon a unique material of formula $CF_1Cl_{0.008}$ can be prepared, the chlorine being an integral part of the compound imparting unique properties. As described in U.S. Pat. No. 4,548,881, this material exhibited novel electrochemical performance in lithium/organic cells, surpassing that of $CF_x$. Additional work as disclosed in greater detail in U.S. Pat. No. 4,695,522 serves to further substantiate the uniqueness of this material. This material serves as the starting material or precursor to the products produced in accordance with the process of the invention.

As described in the above mentioned U.S. patents, by reacting a needle coke based carbon with fluorine and chlorine in appropriate volumetric ratios and at a sufficiently high temperature, precursor carbon chloride fluoride products of the type alluded to above may be prepared. It is important in preparing these precursor carbon chloride fluoride compounds that a molar excess of chlorine to fluorine be maintained during the preparation. Ratios of chlorine/fluorine from about 1.1/1 to about 10/1 can be used. Most preferred for this preparation are molar ratios of chlorine to fluorine of about 1.2/1 to about 1.5/1. Utilization of such ratios minimizes undesirable by-product formulation. The reactant gases for this reaction are further diluted with an inert gas, such as nitrogen, also to minimize the tendency of by-product formation. While the total amount of reactant gases can vary from 1 to 99%, the preferred operating range is about 10–20% by volume.

Temperature required to prepare these precursor materials can vary widely, from about 200°–600° C. Preferably, the reaction is performed at about 375° C. to about 450° C. as this temperature range yields product in the shortest time frame and highest reactor output.

Depending on the temperature, the time necessary to complete the formation of the precursor compounds varies widely, ranging from about 2–12 hours. Under the optimum conditions cited above, a preferred operating time of about 2.5–4 hours would be required.

Using the preferred conditions cited above would typically yield $CF_{0.6-0.7}Cl_{0.08-0.1}$. This precursor is used as the starting material in accordance with the process of the invention for the production of carbon fluoride, $CF_x$ wherein $x \geq 1$ and carbon chloride fluoride, $(C_yF_xCl_z)_n$ wherein $x \geq 0.9$, $y=1$, $z \geq 0.01$. Final product composition, i.e. whether $CF_x$ or $(C_yF_xCl_z)_n$ is isolated is dependent upon reaction temperature as will be described herein.

The precursor $CF_{0.6-0.7}Cl_{0.08-0.1}$ is treated with diluted fluorine in the absence of chlorine at elevated temperatures to effect the transformation to $CF_x$ and highly fluorinated $(C_yF_xCl_z)_n$. The diluent may be any inert diluent gas such as nitrogen, oxygen, helium or sulfur hexafluoride. The concentration of fluorine used in this step can vary between about 1–50% by volume, the remainder of the gas being composed of the inert diluent. Preferred operating conditions employ about 10–20% fluorine, the balance being nitrogen. The time necessary to effect the transformation can vary from about 0.5 to about 5 hours, the preferred time period being about 1–2 hours.

Depending upon the temperature used in this step, the reaction product can be exclusively selected and prepared. At a temperature less than about 350° C., $(C_yF_xCl_z)_n$ wherein $x \geq 0.9$, $y=1$, and $z \leq 0.01$ is prepared. For this selection, temperatures in the range of about 200°–350° C. may be used, the preferred temperature being about 300°–325° C. This allows the production of $(C_yF_xCl_z)_n$ $x \geq 0.9$, $y=1$ and $z \leq 0.01$ to be effectively accomplished in about 1 hour.

At a temperature greater than about 350° C., carbon fluoride, $CF_x$, devoid of any chlorine, is produced. For this selection, typical temperatures can range from about 350°–350° C. with the preferred operating temperatures being from about 360°–375° C. Thus, under these preferred operating conditions, carbon fluoride can be produced in high yield in a period as brief as 1 hour.

The carbon fluoride, $CF_x$, material prepared by the process of the invention is superior to prior art $CF_x$ materials when used as the cathode material in $Li/CF_x$ batteries. It is not known what structural features of the $CF_x$ thus produced are responsible for such difference in properties.

To evaluate the materials produced by the method of the invention, lithium cells were constructed and their discharge performances evaluated. Shown in FIG. 1 is closed circuit potential as a function of discharge for a $Li/CF_{1.02}Cl_{0.002}$ cell. This performance is typical of that of the materials described in U.S. Pat. No. 4,548,881. These latter materials required on the order of 14 hours for preparation compared to approximately 1 hour according to the method of this invention.

Figure 2:
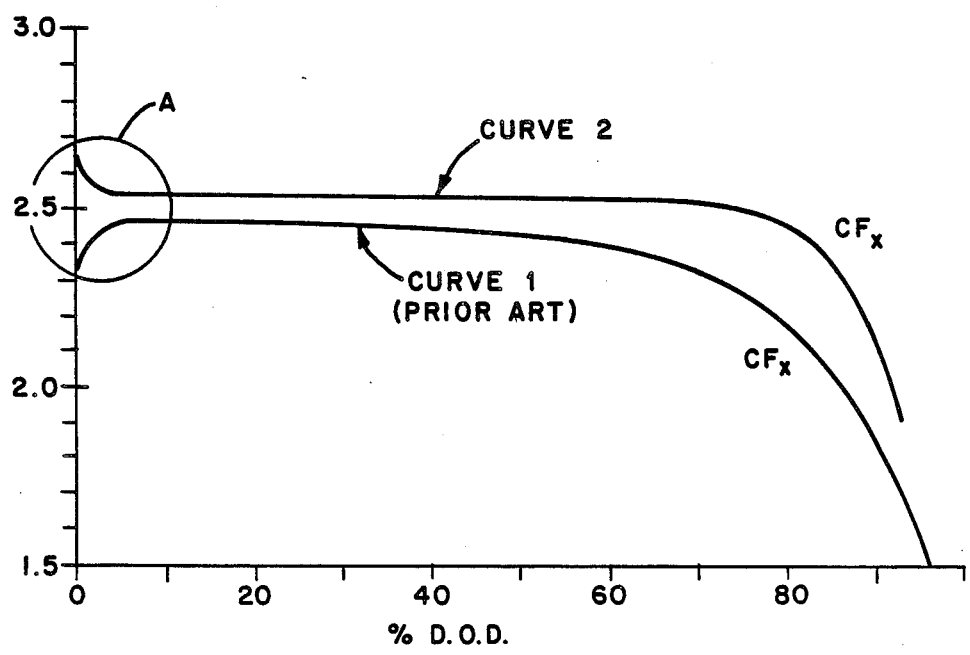
FIG. 2 illustrates the discharge curve of a battery containing $CF_x$ prepared according to the invention compared with a battery employing commercially available $CF_x$.

FIG. 2 illustrates the discharge performance of carbon fluoride, $CF_x$, prepared by the methods of this invention versus prior art $CF_x$. Several unexpected, significant differences were observed in the $CF_x$ prepared by this invention which make it superior over prior art materials. Attention is first directed to the circled area labelled A in FIG. 2 which illustrates the region where a common phenomenon known as closed circuit suppression voltage occurs in $Li/CF_x$ batteries.

This phenomenon relates to the voltage that a Li/$CF_x$ battery will deliver just after the circuit has been closed. This phenomenon exists generally in all prior art Li/$CF_x$ batteries. The initial voltage is, at times, as low as the voltage near the end of battery life (note the low voltage of the lower curve). Electronic circuitry powered by Li/$CF_x$ batteries are complicated by the need to design around this problem. Even in simpler applications, such as lighting, a bulb powered by a Li/$CF_x$ battery would appear dim during the beginning of life. Such a feature would tend to confuse inexperienced users and could make user acceptance of this system very difficult. To compensate for this problem, the battery manufacturers have predischarged their Li/$CF_x$ batteries with concomitant loss of capacity. This predischarge is an additional manufacturing step which tends to slow down processing, increase costs, and consume relatively expensive cathode material resulting in decreased life, sometimes measured as specific energy. In comparison, $CF_x$ produced by the method of this invention exhibits no such problems (see curve 2 of FIG. 2). Consequently, the economics of manufacturing a Li/$CF_x$ battery, particularly when coupled with the short reaction time required for its synthesis, would be substantially enhanced.

A second and totally unexpected beneficial property of $CF_x$ produced by the methods of this invention deals with the improvement of the discharge voltage exhibited during use. A 10% increase in discharge voltage is realized by using $CF_x$ produced by this invention.

The improvement in the $CF_x$ materials produced by this invention over prior art $CF_x$ materials is summarized in Table I which shows a listing of pertinent discharge parameters including that of a carbon chloride fluoride material produced according to the invention.

TABLE I

| MATERIAL | CCVs* VOLTS | VOLTAGE AT VARIOUS DISCHARGE LEVELS (VOLTS) | | | SPECIFIC ENERGY (mWH/g) |
| --- | --- | --- | --- | --- | --- |
| | | 20% | 50% | 67% | |
| $CF_{1.02}Cl_{.002}$ | N.D.+ | 2.97 | 2.93 | 2.83 | 2200 |
| prior art $CF_x$ | 2.33 | 2.45 | 2.40 | 2.31 | 1870 |
| $CF_x$ (this invention) | N.D.+ | 2.54 | 2.54 | 2.51 | 2081 |

*CCVS - Closed Circuit Suppression Voltage
+N.D. - none detected

The following advantages are noted:

(a) From observations derived by reference to work relating to U.S. Pat. No. 4,588,881, the carbon chloride fluoride, $(C_yF_xCl_z)_n$ wherein $x \geq 0.9$, $y=1$ and $z \leq 0.01$, prepared by the method of the present invention is superior in electrochemical performance compared to known prior art carbon fluoride materials, $CF_x$.

(b) Carbon fluoride, $CF_x$, produced in accordance with the invention does not exhibit the deleterious voltage suppression at the onset of voltage which is characteristic of all known prior art $CF_x$. Consequently, additional processing steps may be eliminated thus enhancing the economics of Li/$CF_x$ battery manufacture.

(c) The closed circuit voltages, irrespective of discharge level, of the $CF_x$ manufactured in accordance with the present invention are superior to prior art $CF_x$. As a result of the higher voltages, more diversified applications can result.

(d) Since predischarging is no longer required to eliminate the voltage suppression of a battery using the product prepared according to the invention, the useful life of the battery can be extended on the order of 10% or greater. This is reflected in the increased value in the specific energy of the battery.

It is thus seen that the invention affords advantages over prior art methods for the production of carbon fluoride or carbon fluoride chloride in that relatively short reaction times on the order of 1-2 hours are required to produce carbon fluoride or highly fluorinated carbon fluoride chloride as compared to reaction times which could exceed hundreds of hours as described in the prior art; the precursor carbon fluoride chloride used as a raw material for the synthesis of the compounds described in this invention can be made in as little as 3-4 hours. The carbon fluoride product obtained is regarded as a novel material in that it exhibits superior properties over known prior art carbon fluoride.

The several features and advantages of the invention will be apparent in greater detail referring to the following examples. It will be understood however, that although these examples may describe in detail certain preferred operating conditions of the invention they are given for purposes of illustration and the invention in its broad aspects is not limited thereto.

EXAMPLE 1

2 g of needle coke based carbon were placed in a nickel reaction boat inside a Monel tube and heated for 3 hours at 425±5° C. using a 20% active gas stream containing chlorine to fluorine in a 1.25 to 1 ratio. After cooling, the sample was removed to yield 3.98 g (93%) of $CF_{0.7}Cl_{0.1}$.

EXAMPLE 2

5 g of $CF_{0.7}Cl_{0.1}$ as prepared in Example 1 were treated at 300±10° C. with a 10% $F_2$ gas stream for 1.5 hours. A yield of 5.6 g (90%) of a cream colored solid which analyzed as $CF_{0.97}Cl_{0.001}$ was isolated.

EXAMPLE 3

5 g of $CF_{0.7}Cl_{0.1}$ as prepared in Example 1 were treated at 350±5° C. with a 10% $F_2$ gas stream for 1 hour. A yield of 5.85 g (94%) of an off-white solid which analyzed as $CF_{1.03}Cl_{0.001}$ was isolated.

EXAMPLE 4

4.5 1 g of $CF_{0.7}Cl_{0.1}$ as prepared in Example 1 were treated at 350±5° C. with a 10% $F_2$ gas stream for 1 hour. A yield of 5.28 g (95%) of a light tan material which analyzed as $CF_{1.01}Cl_{0.001}$ was isolated. This run serves to demonstrate the reproducibility of the procedure.

EXAMPLE 5

4 g of $CF_{0.7}Cl_{0.1}$ as prepared in Example 1 were treated at 360° C. with a 10% $F_2$ gas stream for 1 hour. A yield of 4.28 g (96%) of a white solid which analyzed as $CF_{1.03}$ was isolated. No chlorine was detected in a sample of this example.

EXAMPLE 6

4 g of $CF_{0.7}Cl_{0.1}$ as prepared in Example 1 were treated at 400° C. with a 10% $F_2$ gas stream for 1 hour. A yield of 4.1 g (83%) of a white solid which analyzed as $F_{1.03}$ was isolated. No chlorine was detected in a sample of this example.

EXAMPLE 7

Experimental cells were constructed using a lithium anode, a 1 molar $LiBF_4$ electrolyte of 50/50 dimethoxy ethane/propylene carbonate and a cathode consisting of 83–85% by weight $CF_{1.03}Cl_{0.001}$ carbon chloride fluoride, 12–13% by weight of acetylene black and 3–5% by weight of poly(tetrafluoroethylene). The cell was discharged at a cathodic current density of 0.36 mA/cm². FIG. 1 plots the closed circuit voltage (CCV) versus depth of discharge (DOD) for the cathode material.

EXAMPLE 8

Experimental cells were constructed using a lithium anode, a 1 molar $LiBF_4$ electrolyte of 50/50 dimethoxy ethane/propylene carbonate and a cathode consisting of 83–85% by weight of either carbon fluoride, $CF_{1.03}$, prepared in Example 5 or ACCUFLOUR®—$CF_x$, 12–13% by weight of acetylene black and 3–5% by weight of poly(tetrafluoroethylene). The cell was discharged at a cathodic current density of 2.4 mA/cm². FIG. 2 plots the closed circuit voltage (CCV) versus depth of discharge (DOD) for these cathode materials.

It will be understood that variations may be made in the several conditions and ranges disclosed and that the disclosed limitations are provided primarily to better describe the invention and should not be regarded as limitations except as set forth in the claims which follow.

What is claimed is:

1. A method of preparing fluorinated carbon compositions selected from the group consisting of $CF_x$ and $(C_yF_xCl_z)_n$ wherein x has a value of about 0.7 to 1.2, y has a value of about 1, n has a value of about 1 to about 100,000 and z has a value of less than about 0.1 which comprises contacting a carbon fluoride chloride compound of the formula $$(C_yF_xCl_z)_n$$

wherein x is less than 0.7, y is less than or equal to 1 and z is less than about 0.1 with a fluorine gas blended with an inert diluent gas in the absence of chlorine gas, at an elevated temperature not in excess of about 450° C.

2. The method of claim 1 for preparing $CF_x(X \geq 1)$ wherein the reaction temperature is from about 350° C. to about 400° C.

3. The method of claim 1 for preparing $C_yF_xCl_z$ ($y \geq 0.9$, $x=1$, $Z \leq 0.01$) wherein the reaction temperature is less than about 350° C.

4. The method according to claim 1, wherein the concentration of fluorine gas used in the reaction is about 10–20% by volume.

5. The method according to claim 1, wherein the reaction time is from about 1–2 hours.

6. The method according to claim 1 wherein the intermediate carbon fluoride chloride, $(C_yF_xCl_z)_n$ $X \leq 0.7$, $y \leq 1$ and $Z \leq 0.1$, is prepared by contacting needle coke carbon with a mixture of chlorine and fluorine gas.

7. The method according to claim 6 wherein the preferred molar ratio of chlorine to fluorine is from about 1.2/1 to 1.5/1.

8. The method according to claim 6 wherein the reaction temperature for the preparation of said intermediate carbon fluoride chloride is from about 375° C. to 450° C.

9. The method according to claim 6 wherein the reaction time for the preparation of said intermediate carbon fluoride chloride is between about 2.5 to 4.0 hours.

10. The $CF_x(x \geq 1)$ cathode material produced by the method of claim 1 wherein said cathode material does not exhibit voltage suppression.

* * * * *